Oct. 20, 1970 R. J. HELLEN 3,535,503

MULTIPLIER-DIVIDER COMPUTING CIRCUIT

Filed Sept. 12, 1968

INVENTOR.
RICHARD J. HELLEN

BY

ATTORNEY

United States Patent Office 3,535,503
Patented Oct. 20, 1970

3,535,503

MULTIPLIER-DIVIDER COMPUTING CIRCUIT

Richard J. Hellen, Green Hills, Ohio, assignor to General Electric Company, a corporation of New York Filed Sept. 12, 1968, Ser. No. 759,405
Int. Cl. G06g 7/16, 7/50
U.S. Cl. 235—195 16 Claims

ABSTRACT OF THE DISCLOSURE

A circuit for dividing a variable represented by an electrical analogue frequency signal by a variable represented by an electrical analogue current signal includes a wave shaping circuitry for converting the frequency signal into a plurality of pulses having a repetition rate equal to the frequency. A flip-flop is switched at that repetition rate, the duration of one flip-flop state being controlled by gating and integrating circuitry responsive to the current signal. The desired quotient is represented by the average value of voltages obtained from the flip-flop which may be referenced by clipping circuitry for further mathematical operations.

This invention generally relates to computation systems and more particularly to improvements in dividing one variable signal by another variable signal.

Computation systems for performing various mathematical functions have long been known and used extensively. Such systems have been employed in mechanical, electrical, hydromechanical and, more recently, fluidic embodiments.

Computation systems providing an analogue output which continually reflects the effects of variable inputs have represented a great challenge to those skilled in the art to provide a high degree of accuracy and reliability with simple and inexpensive system equipment. These problems are particularly exemplified where it is desired to divide one variable by another.

Electrical computation systems have many advantages in speed of operation, compactness, economy and a highly developed state of the art insofar as the availability and reliability of individual components are concerned. However, prior electrical systems for performing such a division function have been unduly complicated or lacked sufficient accuracy and reliability or both.

Beyond simply providing a division function, it is also desirable or necessary to simultaneously perform one or more multiplication functions of other variables. Here again, prior art systems have been unduly complicated or lacked sufficient accuracy.

It is therefore one object of this invention to provide an improved system for the division of variables, which is simple, accurate, and inexpensive.

It is a specific object of this invention to provide for the division of a variable, whose value is represented by a frequency signal, by another variable, whose value is represented by the magnitude of a signal.

In accordance with one aspect of the invention, these and other objects are achieved by controlling means for integrating a magnitude signal as a function of the frequency signal to obtain an output representative of the division of the two signals.

The subject matter of the invention is particularly pointed out and distinctly claimed in the concluding portion of the specification. For a complete understanding of an embodiment of the invention, together with further objects and advantages thereof, reference should be made to the following description taken in conjunction with the accompanying drawings.

Figure 1:
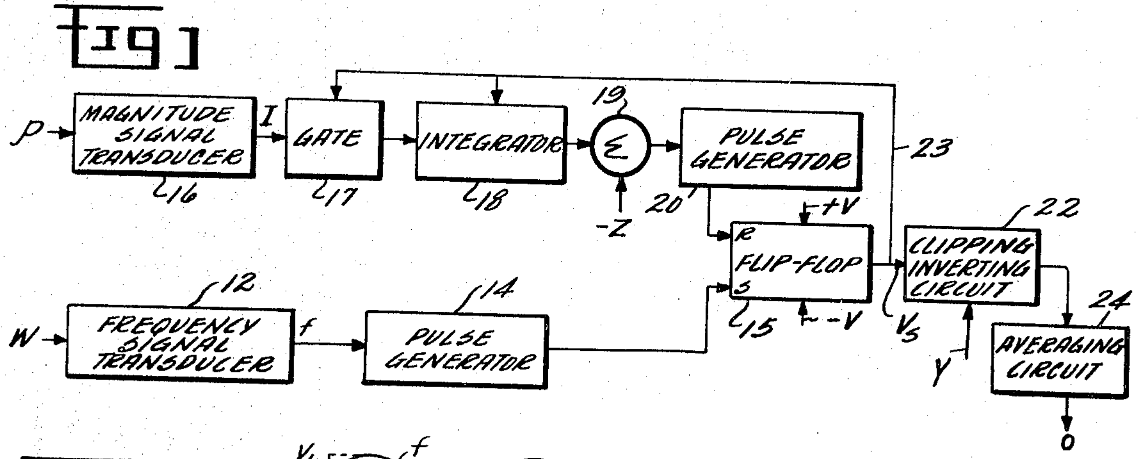
FIG. 1 is a block diagram of the division circuit of this invention.

FIG. 1 illustrates in block diagram form a circuit in accordance with the present invention, which provides an output signal reflecting the division of one parameter, or signal, by another parameter or signal. For example, in aircraft controls it is frequently desirable to continuously monitor the ratio between compressor discharge pressure and fuel flow, both being variables which can change continuously and at relatively rapid rates.

In the illustrated circuit W indicates the fuel flow parametric input which could be in the form of a mechanical signal and P represents the compressor discharge pressure input which could be in the form of a pressure signal. These two inputs are inverted into appropriate signals which provide an output signal O.

The fuel flow input W is fed to the frequency signal transducer 12 which produces output signal *f*, having a frequency proportionate, in a desired ratio, to the parametric value of W. The signal *f* is then fed to a pulse generator 14 which provides an output pulse for a given characteristic of the frequency signal. These pulses provide one input at S to a flip-flop or switching circuit 15.

The second input of the flip-flop circuit 15 is derived from the parametric input P. The input P is fed to a magnitude signal transducer 16 which provides an output signal I, the magnitude of which has a predetermined relationship to the parametric value of the signal P. The signal I passes through a gate or switch 17, as will later be explained, to an integrator 18. The output of the integrator 18, once the signal I is fed thereto, increases in value at a rate proportionate to the magnitude of the signal I. The integrator output is compared with a signal Z at a summation point 19. When the integrator output reaches a predetermined relationship relative to the signal Z, there is a signal input to a second pulse generator 20 and a resultant signal to the second input R of the flip 15.

The flip-flop 15 has two reference voltages (+V, −V), one or the other of which is connected to the flip-flop output ($V_S$), dependent upon which of the inputs S or R last had a pulse input thereto. The flip-flop signal output $V_S$ is connected to a clipping-inverting circuit 22, which provides output pulses of fixed height. These output pulses are fed to an averaging circuit 24 which provides a signal value having a magnitude reflecting the instantaneous division of the parameter W by the parameter P.

Figure 2:
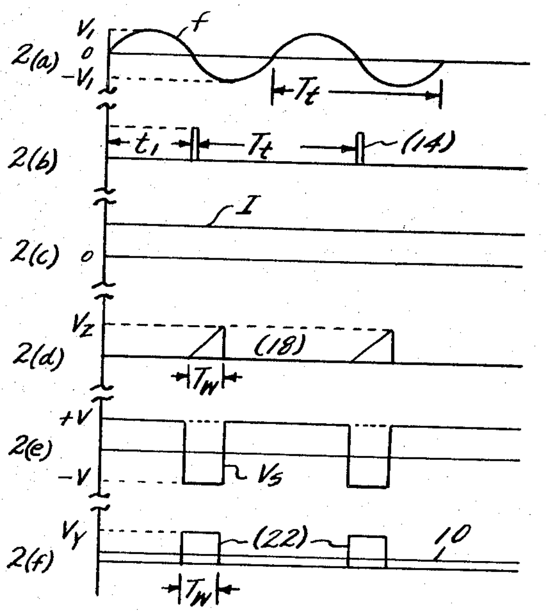
FIG. 2 is a timing chart illustrating the operation of the block diagram of FIG. 1.

While various forms of signals and specific components, in the broader aspects of the invention, can be employed, reference will next be made to FIG. 2, describing these signals in terms of electrical signals. The several plots in FIG. 2 are based on a common time abscissa. Plot 2*a* indicates the frequency signal *f* generated by the frequency signal transducer 12. This is a positive-negative going voltage signal conveniently sinusoidal in form which has a frequency proportionate to the parameter W. It will be seen from plot 2*b* that the pulse generator 14 produces positive going output pulses each time the signal *f* goes from a positive to a negative value. The time period between the pulses from the generator 14 is inversely proportionate to the frequency of the transducer signal *f*.

The plot 2*c* represents the signal I which is a current signal having a value or magnitude proportionate to the magnitude of the parameter P. While illustrated as having a constant value, this is simply for simplicity of illustration, and the value would vary as the parameter P varies.

Assuming that as an initial condition, the positive reference voltage (+V) is connected to the output ($V_S$) of the flip-flop, when a first pulse output from the generator 14 provides an input to the flip-flop, the minus reference voltage (−V) will be imposed on the output $V_S$. This will be illustrated by comparing on a time basis plots 2*b* and 2*e*. When this occurs, there will be a negative signal input by way of line 23 from the flip-flop output to the gate 17. The gate 17 thereupon connects the signal I to the integrator 18. The output of integrator 18 will increase in voltage value at a rate which is a direct function of the magnitude of the signal I and until it reaches a value equal to that of the reference signal Z at the summation point 19. Assuming as indicated that the output signal is a positive voltage signal, Z would be a negative voltage signal. When the integrator output slightly exceeds this reference signal value, there will be a positive signal input to the pulse generator 20. Responsive to this positive signal input, there will be a signal output therefrom which is applied to the flip-flop input R. The flip-flop is responsive to this signal input to switch the positive reference voltage V (+V) to the flip-flop output $V_S$. When the $V_S$ output becomes positive there is an immediate input to the gate 17, causing it to prevent further transmission of the signal I to the integrator 18. There is also an input to the integrator 18 which resets it to its starting value. Thus the integrator output takes substantially the form illustrated in plot 2*d*.

The quotient value of the division of parameter W by parameter P is represented by the negative going portions of the flip-flop output signal $V_S$ which are indicated by the shaded portions of that output in plot 2*e*. In order to convert this output into a more usable and accurate form, the signal $V_S$ is fed to the clipping-inverting circuit 22.

The circuit 22 inverts the negative portion of the shaded portion of the output $V_S$ to a positive value, providing pulses indicated at (22) in FIG. 2*f*. These pulses are then fed into the averaging circuit 24 wherein the average voltage value of the pulses is derived to provide the output signal O, also shown in FIG. 2*f*.

It will be apparent that the magnitude of the output signal O represents the quotient of the parameter values *W/P*. This is qualitatively indicated simply by noting that if the parameter W were to double, the pulses (14) would be generated at twice the rate; there would be, as a result, twice as many negative going pulses in the flip-flop output $V_S$; twice as many clipping/inverting circuit output pulses (22) and accordingly the output signal O would be doubled. Conversely, if the magnitude of the parameter P were to double, the rate of increase in the output of the integrator circuit 18 would double and the reference voltage Z would be reached in one-half the time. The width or time duration of the negative going portions of the flip-flop output signal $V_S$ would be cut in half; the clipping/inverting signal output pulses (22) would have half the time duration and, therefore, the output value of the averaging circuit, signal O, would also be cut in half.

One limiting factor to be noted is that the minimum rate at which the integrator output may be set to reach the reference value Z is limited by the minimum time period between the frequency pulses (14). Otherwise the flip-flop would not be reset to be responsive to the next successive pulse 14.

While the reference voltages Z and Y have herein been referenced as constants, it is also possible and advantageous in many instances to make their values variable. Thus the present circuit, while providing a simple and accurate method for obtaining a quotient value of one variable divided by another, has the added capability of providing an output representative of a plurality of variables in the numerator or denominator.

To this end it will be apparent that if the value Z varied in accordance with another parameter, let us say it was determined that we wanted to have an output representing the quotient value of *WZ/P* and the Z value previously described represented unity, doubling of the value Z in accordance with the parameter it represents would double the time for the integrator to provide a triggering signal to the pulse generator 20. This, in turn, would double the negative going portions of the flip-flop output $V_S$ and, likewise, double both the pulse outputs (22) from the clipping/inverting circuit and the output value O from the averaging circuit 24.

Conversely, if the relationship *W/PZ* were sought, then the reference voltage Z would vary inversely in magnitude with the parameter which it represents. Thus, if the parameter which it represents doubled, the value Z would be cut in half, the time duration of the output pulses (18) of the integrator would be cut in half, as would also be the negative going portions of the flip-flop output $V_S$ and clipping/inverting circuit pulses 22. The end result would be that the averaging circuit O would likewise be reduced by one-half.

The same results described in connection with varying the reference Z as representative of a parameter can also be obtained by varying the reference Y as representative of a parameter so long as the value Y does not exceed the value minus V (great latitude can be obtained in this area by proper amplification). If the relationship *WY/P* is sought, then the value of Y would be increased in direct proportion to the parameter it represents. If the relationship *W/PY* were desired, then the value of Y would be varied inversely proportionate to the parameter it represents.

The relationships of Z and Y as simultaneous variables can be had with both variables in either the numerator or denominator or one in the numerator and the other in the denominator, as desired.

There follows a description of a specific and preferred electrical circuit for attaining the ends described above in connection with the block diagram. The correspondency between the various portions of this circuit and the elements of the block diagram will be obvious.

Figure 3:
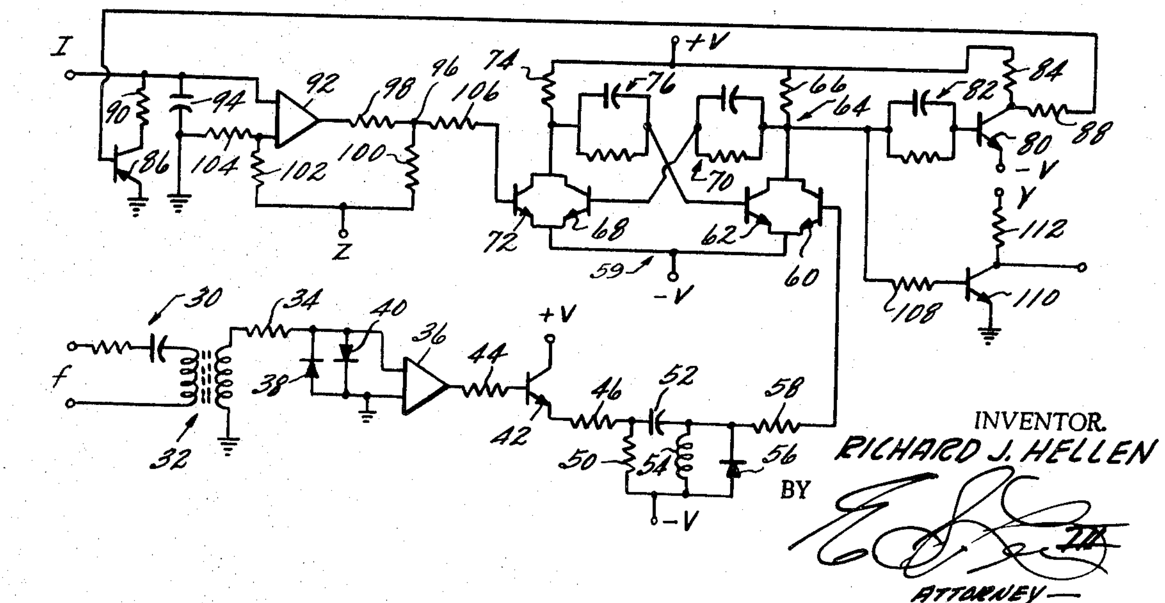
FIG. 3 is a preferred embodiment of the invention.

In FIG. 3, the constant current I is seen at the upper left-hand portion of the figure. The frequency *f* which is represented by the alternating current $V_1$ is coupled through a series-connected filter circuit 30 to the primary winding thereof and a resistor 34 to an inverting input of an operational amplifier 36. Also coupled to the inverting input of operational amplifier 36 are a pair of reverse-parallel connected diodes 38 and 40 which are connected to a reference level, such as ground potential.

Diodes 38 and 40 clip the signal obtained from the secondary winding of transformer 32. As this clipped signal is fed to the inverting input of operational amplifier 36 which is operated in an open-loop mode, that is, without feedback, large amplification of the clipped signal is obtained. In passing, any operational amplifier well known to the art would be suitable for use as amplifier 36 and for the other operational amplifier to be later described. Generally, such amplifiers have an open-loop gain of $10^5$ or higher.

Therefore, the output signal of operational amplifier 36 is a large amplitude square wave which alternates at the frequency *f* obtained from the signal voltage $V_1$ applied to the primary winding of transformer 32. Thus, the general purpose of the circuitry including transformer 32 and operational amplifier 36 is to convert the sinusoidally varying transducer signal *f* into a square voltage suitable for use in the succeeding circuitry of the wave shaper or pulse generator.

The output voltage of amplifier 36 is coupled to the base of a semiconductor switching means or transistor 42 through the medium of a resistor 44. Transistor 42 is connected in an emitter-follower configuration with its collector being connected to a positive voltage supply +V and its emitter connected through a resistor 46 to a pulse-forming circuit generically designated as 48. Pulse-forming circuit 48 comprises a resistance 50 coupled between the input terminal and a negative voltage supply −V and a capacitance 52 coupled between the input and output terminals of circuit 48. Coupled between the output terminal thereof and the negative voltage supply −V is a parallel connection of a saturable core 54 and a diode 56.

The saturable core flux capacity as measured by its volt second product is made small so that when transistor 42 is conducting, the voltage across the saturable core will exist for a very short time, typically a few microseconds. In this manner a narrow pulse is generated. When transistor 42 is not conducting, the charge stored in capacitor 52 will discharge and reset the flux in the saturable core 54 through resistor 50. Diode 56 is used to shunt the negative voltage induced during reset to protect transistor 60.

The pulses obtained at the output terminal of pulse-forming circuit 48 are coupled by means of a resistance 58, a flip-flop in the form of a bistable multivibrator 59. Resistor 58 is coupled to the base of a transistor 60 which is connected in parallel with a transistor 62. The emitters of both transistors are connected to the negative voltage supply −V and the colletors thereof to an output point 64 are likewise connected to the positive voltage supply +V through a resistance 66 and to the base of a transistor 68 through a first coupling network 70. A transistor 72 is connected in parallel with transistor 68 in exactly the same manner as is transistor 60 connected in parallel with transistor 62. Therefore, the emitters thereof are coupled to the negative voltage supply −V and the collectors thereof are connected to the positive voltage supply +V through a resistance 74 and to the base of transistor 62 through a second coupling network 76. Finally, the base of transistor 72 serves as the reset input to the flip-flop.

Assuming that transistors 60 and 62 are initially in a non-conducting state, a positive pulse coupled from pulse-forming circuit 48 through resistor 58 places transistor 60 in a conducting state, thus lowering its collector voltage to approximately −V and thereby placing transistor 62 into a conducting state. The collector voltage −V is then coupled to the base of transistor 68 by coupling network 70. As transistor 68 is biased at −V, it is placed in a non-conducting state by the voltage from the collectors of transistors 60 and 62 and the collector voltage of transistor 68 and thus transistor 72 rises to +V. These collector voltages are coupled to the base of transistor 60 to maintain transistors 60 and 62 in a conducting state after cessation of the positive pulse from pulse-forming circuit 48.

Output point 64 is connected to base of a transistor 80 by means of a coupling network 82. Transistor 80 has its emitter connected to the negative voltage supply −V and its collector supply to +V through a resistor 84. Accordingly, as the voltage on the collectors of transistor 60 and 62 and thus output terminal 64 changes to −V upon presence of a positive pulse at the base of transistor 60, transistor 80 is immediately placed in a non-conducting state and its collector voltage rises to +V. In an alternate situation, later to be described, transistor 80 is in a conducting state before presence of the positive pulse and its collector voltage is approximately −V.

Transistor 80 and its associated circuitry form a first part of a gate circuit. A second part of the gate circuit is provided by a transistor 86 whose base is connected to the emitter of transistor 80 by means of a resistor 88. The emitter of transistor 86 is connected to a source of reference potential, such as ground, and the collector thereof is connected to the input and output terminals of the gate 18 by means of a resistor 90. When the collector voltage of transistor 80 has a value of −V, as in the alternate situation, transistor 86 is placed in a conducting state and the constant current I is shunted to the reference potential or ground therethrough. However, when the collector voltage of transistor 80 is +V, or when it is placed in a non-conducting state by a positive pulse at the base of transistor 60, transistor 86 is also placed in a non-conducting state and the constant current I is not shunted therethrough. It may be seen that in other embodiments, both transistors 80 and 86 may comprise any switching means, such as an electromechanical relay or other semiconductor switching device.

The input and output terminal of the gate circuit is connected to an inverting input of an operational amplifier 92. Connected between the inverting input and a source of reference potential is an energy storage means or a capacitor 94. The output terminal of amplifier 92 is connected to a point 96 by means of a resistor 98. Both point 96 and the reference input of operational amplifier 92 are connected to the reference voltage Z by means of resistors 100 and 102, respectively. In addition, the reference input of operational amplifier 92 is connected to a source of reference potential, ground, by means of a resistor 104.

In operation, when the current I is connected through gate 18 or to the inverting input of operational amplifier 92, as when transistor 86 is placed in a non-conducting state, capacitor 94 begins to charge at a rate as determined by the input and output impedances appearing at the inverting input of operational amplifier 92. Thereafter, the output voltage of operational amplifier 92 increases in a ramp-like manner and is coupled by resistor 98 to common point 96. It is desirable that voltage Z have a negative value with respect to the reference voltage established throughout the division circuit. Therefore, resistor 100 serves to maintain a negative voltage $V_Z$ at the common point 96. At a point in time when the output voltage from amplifier 92 exceeds the magnitude of the negative voltage $V_Z$, common point 96 has a positive value with respect to the system reference. As the common point 96 is coupled to the base of transistor 72 by means of a resistor 106, transistor 72 is thereby placed in a conducting state by the positive-going portion of the voltage appearing at common point 96. Thereafter, transistors 60 and 62 are placed in a nonconducting state by means of the negative voltage appearing at the common collectors of transistors 68 and 72 which is couped to the base of transistor 62 by means of coupling network 76. Transistors 68 and 72 are maintained in a conducting state by the voltage appearing at output terminal 64 as coupled to the base of transistor 68 by means of coupling network 70.

In subsequent operation, the voltage at output point 64 approaches the positive supply voltage +V. Thereafter, transistor 80 is placed in a conducting state, or in the alternate situation, and its collector voltage drops to −V. Transistor 86 is also placed in a conducting state. Thereafter, the constant current I is diverted from the capacitor 94 and the inverting input of operational amplifier 92 and capacitor 94 then discharges through transistor 86.

The quarewave voltage appearing at output point 64 is coupled by means of a resistor 108 to the base of a transistor 110 whose emitter is coupled to reference potential, such as ground, and whose collector is coupled to a clipping voltage Y through a resistor 112. The collector of transistor 110 also serves as an output terminal for the division circuit.

As output terminal 64 alternates between approximately +V and −V, the collector voltage of transistor 110 varies between the reference voltage and $+V_Y$.

From the foregoing specification, it should be recognized by those skilled in the art that this invention is not limited to the specific embodiment illustrated, nor to the use of electrical/electronic components in performing the described computation functions. The circuitry illustrated in the foregoing specification teaches a preferable embodiment from the standpoint of sensors providing electrical analogue signals having particular wave shapes, as well as possessing other additional advantages such as utilization of standard components.

Having thus described the invention, what is claimed as novel and desired to be secured by Letters Patent of the United States is:

1. A circuit for producing a quotient which represents the division of a variable whose value is represented by a frequency signal by a variable whose value is represented by a current signal, comprising:

switching means having first and second input terminals and an output terminal, said switching means being capable of being placed into first and second conduction states in response to signals alternately applied to said first and second inputs, each of said first and second conduction states furnishing a predetermined voltage value on said output terminal.

means coupled between the frequency signal and the first input of said switching means, said means converting the frequency signal into a plurality of pulses having a repetition rate equal to that of said frequency signal, each of said pulses placing said switching means in said first conduction state, gating means having said output terminal coupled to a control terminal thereof and having the constant current signal coupled to an input terminal thereof, said gating means passing the constant current signal to its output terminal when said switching means is in said first conduction stage, integrating means coupling the output terminal of said gating means to said second input of said switching means, said integrating means producing an output signal after a time period inversely proportional to level of the constant current signal, said integrating means thereby placing said switching means into said second conduction state whereby the average value of the voltages, over a finite period of time, present at said output terminal of said switching means is proportional to the desired quotient.

2. The division circuit of claim 1, further including a source of a multiplying voltage coupled to said integrating means, the time interval of said integrating means thereby being directly proportional to a voltage derived from said multiplying voltage.

3. The division circuit of claim 1, further comprising, a clipping means having its input connected to said output terminal of said switching means, a source of a clipping voltage, said clipping voltage being applied to said clipping means whereby the voltage present at an output point of said clipping means has a peak value equal to that of said clipping voltage.

4. The division circuit of claim 3, further including a source of a multiplying voltage coupled to said integrating means, the time interval of said integrating means thereby being directly proportional to a voltage derived from said multiplying voltage.

5. The division circuit of claim 4 wherein the frequency signal has a sinusoidally-varying waveform and the converting means produces a pulse output for every half-cycle of that waveform.

6. A division circuit for providing a quotient of a first variable whose value is represented by a frequency signal by a second variable whose value is represented by a constant current signal, comprising, means converting the frequency signal into a series of pulses having a given polarity whose repetition rate is proportional to the value of the frequency signal, energy storage means, gating means coupling the constant current signal to said energy storage means, a source of a multiplying voltage, voltage comparing means having said energy storage means connected to one input thereof, and said multiplying voltage source connected to another input thereof, said voltage comparing means producing a signal at its output when the voltage level on said energy storage means equals a voltage derived from the multiplying voltage, a flip-flop having set, reset and output terminals, said flip-flop having connected to its set terminal the output of said pulse converting means and having connected to its reset terminal the output of said voltage comparing means, said flip-flop having its output terminal coupled to a control terminal of said gating means, whereby each pulse from said pulse converting means places said flip-flop in a first conducting state, and the output signal of said voltage comparing means places siad flip-flop in a second conducting state, said flip-flop thereby controlling said gating means to charge said energy storage means by the constant current signal and discharge said energy storage means through said gating means so that the output terminal of said flip-flop has a signal thereon which comprises a series of pulses having an average value proportional to the magnitude of the reference voltage times the value of the first variable divided by the value of the second variable.

7. A circuit for providing division of a first electrical analogue signal which comprises a voltage having a frequency proportional to a first variable by a second electrical analogue signal which comprises a current whose level is directly proportional to the value of a second variable, comprising, a bistable multivibrator having two conduction states, two inputs and an output terminal, and two distinct voltages on said output terminal corresponding to said two conduction states, the presence of a signal at either input being sufficient to switch said bistable multivibrator from one conduction state to the other, wave shaping means coupling the first electrical analogue signal to one input of said bistable multivibrator, said wave shaping means furnishing a plurality of pulses having a given polarity which occur at a repetition rate equal to the frequency of the first electrical analogue signal, integrating means, the output of said integrating means being connected to the other input of said bistable multivibrator, gating means having a control terminal, an input terminal, and an output terminal, said second electrical analogue signal being connected to the input terminal thereof and the output terminal being connected to an input of said integrating means, means coupling the output terminal of said bistable multivibrator to the control terminal of said gating means, said gating means being placed by the voltages on said output terminal in a blocking state during one of said conduction states and being placed in a passing state during the other of said conduction states, whereby, when said bistable multivibrator is placed in one of said conducting states by a pulse from said wave shaping means, said gating means is placed in a passing state so that the second electrical analogue signal is applied to said integrating means, said integrating means producing an output signal when a voltage derived from the second electrical analogue signal equals the reference voltage, whereupon said bistable multivibrator is placed in the other conducting state, said gating means then being placed in a blocking state so that the average value of the voltage on the output terminal of said bistable multivibrator represents the ratio of the first electrical analogue signal divided by the second electrical analogue signal.

8. The circuit of claim 7 wherein said wave shaping means further includes, an operational amplifier having as an input thereto the first electrical analogue signal, said operational amplifier producing at its output terminal a large amplitude square wave having the frequency of the first electrical analogue signal, a source of a reference voltage, and a pulse-forming circuit including a capacitor having a first side coupled to the output of said operational amplifier and a second side coupled to the input of said bistable multivibrator, said pulse-forming circuit also comprising a saturable core connected between the second side of said capacitor and said source of a reference voltage, and a diode connected in parallel with said saturating core, whereby only pulses of a given polarity are presented to said bistable multivibrator.

9. The circuit of claim 8 wherein the gating means further comprises a semiconductor switching means having a control electrode and two conducting electrodes, one of the conducting electrodes being connected to the second electrical analogue signal and the other conducting electrode being connected to said reference voltage source.

10. The apparatus of claim 7 wherein said integrating means further comprises,
an energy storage means coupled between the input of said integrating means and said source of a reference voltage,
an operational amplifier having an input thereof coupled to said second electrical analogue signal and an output thereof coupled to the output terminal of said integrating means,
a source of a multiplying voltage, and
means coupling said multiplying voltage source to the output terminal of said integrating means.

11. A circuit for providing an output signal representative of the division of a first signal input by a second signal input,
said first signal having a characteristic which recurs at a rate proportional to a given value,
said second signal having a magnitude proportionate to another given value,
means responsive to each cyclic characteristic of said first signal for providing an output of a predetermined magnitude after a period of time inversely proportionate to the magnitude of said second signal, said cyclic characteristic responsive means including switching means responsive to alternate inputs thereto for providing an output which, in response to each input thereto, instantaneously changes between values greater and less than a reference value,
whereby the output signal, represented by the average magnitude of the output over a finite period of time, reflects the quotient of the first signal divided by the second signal.

12. A circuit as in claim 11 wherein,
said first signal provides one input to said switching means, and
further comprising means for providing a second input to said switching means, including means responsive to said second signal for providing an integrated output at a rate proportional to said second signal, and means responsive to said integrated output arriving at a given value for providing the second input to said switching means.

13. A circuit as in claim 12, wherein,
the integrating means have an integrating rate sufficient to reach said predetermined reference value within a time period less than the time period between the recurrent characteristic of said first signal.

14. A circuit as in claim 12 wherein,
the means for providing said second input to the switching means include means responsive to the output of the switching means going from one value to another, with respect to said reference value, for initiating the means for providing said integrated output and responsive to the switching means output going from said other value to said one value for inactivating and resetting said means for providing an integrated output.

15. A circuit as in claim 12, further comprising,
means for providing output pulses having a predetermined magnitude relative to a fixed reference value.

16. A circuit as in claim 14, further comprising,
means for varying said fixed reference value for said output pulses as a function of parametric value of another variable whereby the output signal represents the multiplication or division quotient value of the first and second signals by a third parametric value, dependent upon whether the reference is inversely or directly varied relative to said third parametric value.

References Cited

UNITED STATES PATENTS

| | | | |
|---|---|---|---|
| 3,096,434 | 7/1963 | King | 235—151.34 |
| 3,278,728 | 10/1966 | Ragsdale | 235—151.34 |
| 3,333,468 | 8/1967 | Jacobs. | |
| 3,404,264 | 10/1968 | Kugler | 235—151.34 X |
| 3,409,763 | 11/1968 | Schoppe et al. | 235—151.34 |

MALCOLM A. MORRISON, Primary Examiner

J. F. RUGGIERO, Assistant Examiner

U.S. Cl. X.R.

235—151.34, 196